Aug. 5, 1924.
L. S. RICE
1,503,710
DUMPING VEHICLE
Filed Aug. 4, 1921
4 Sheets-Sheet 1
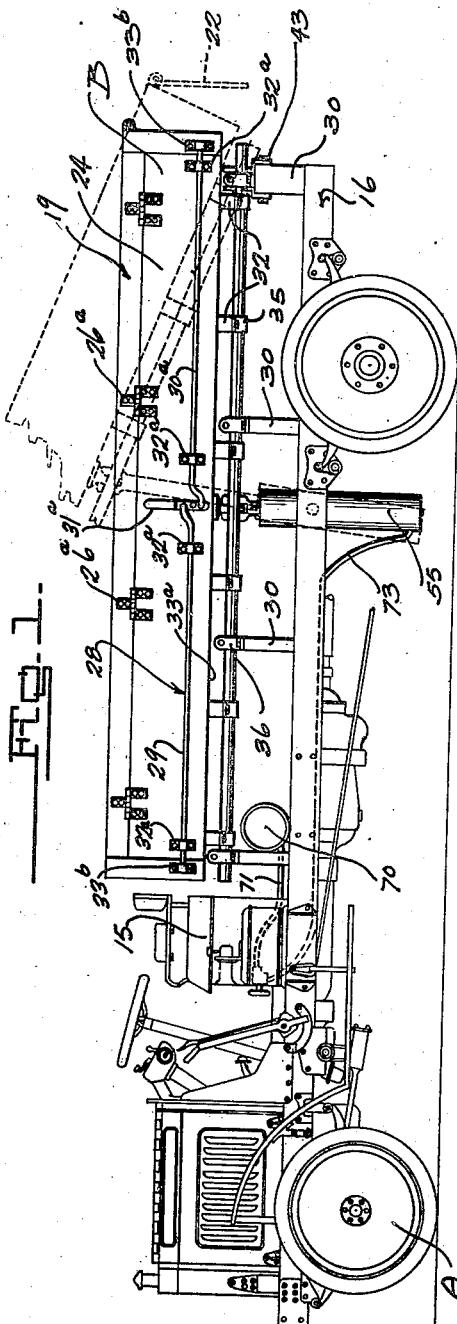
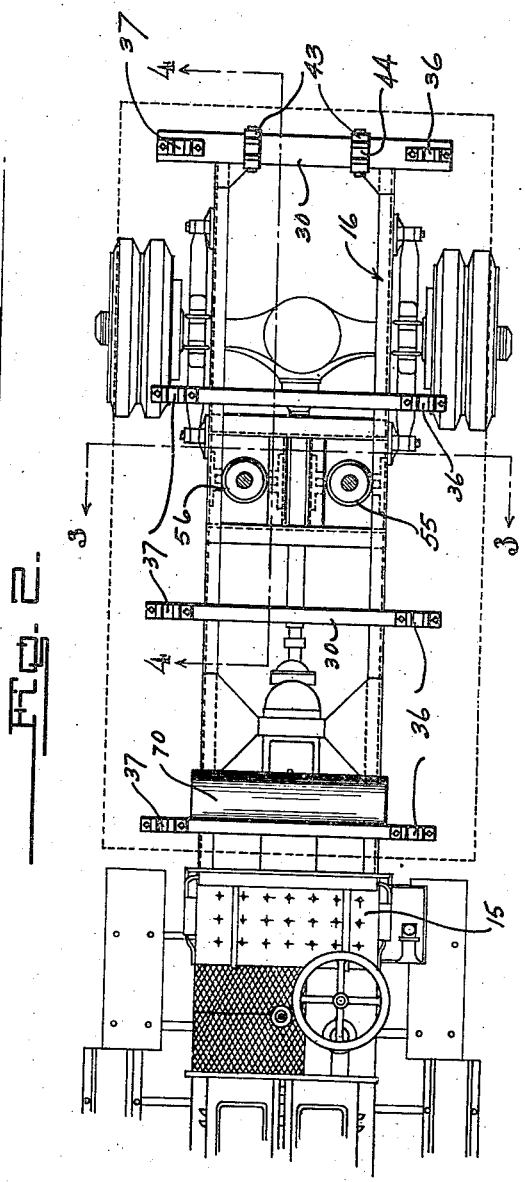
Inventor
Leo S. Rice

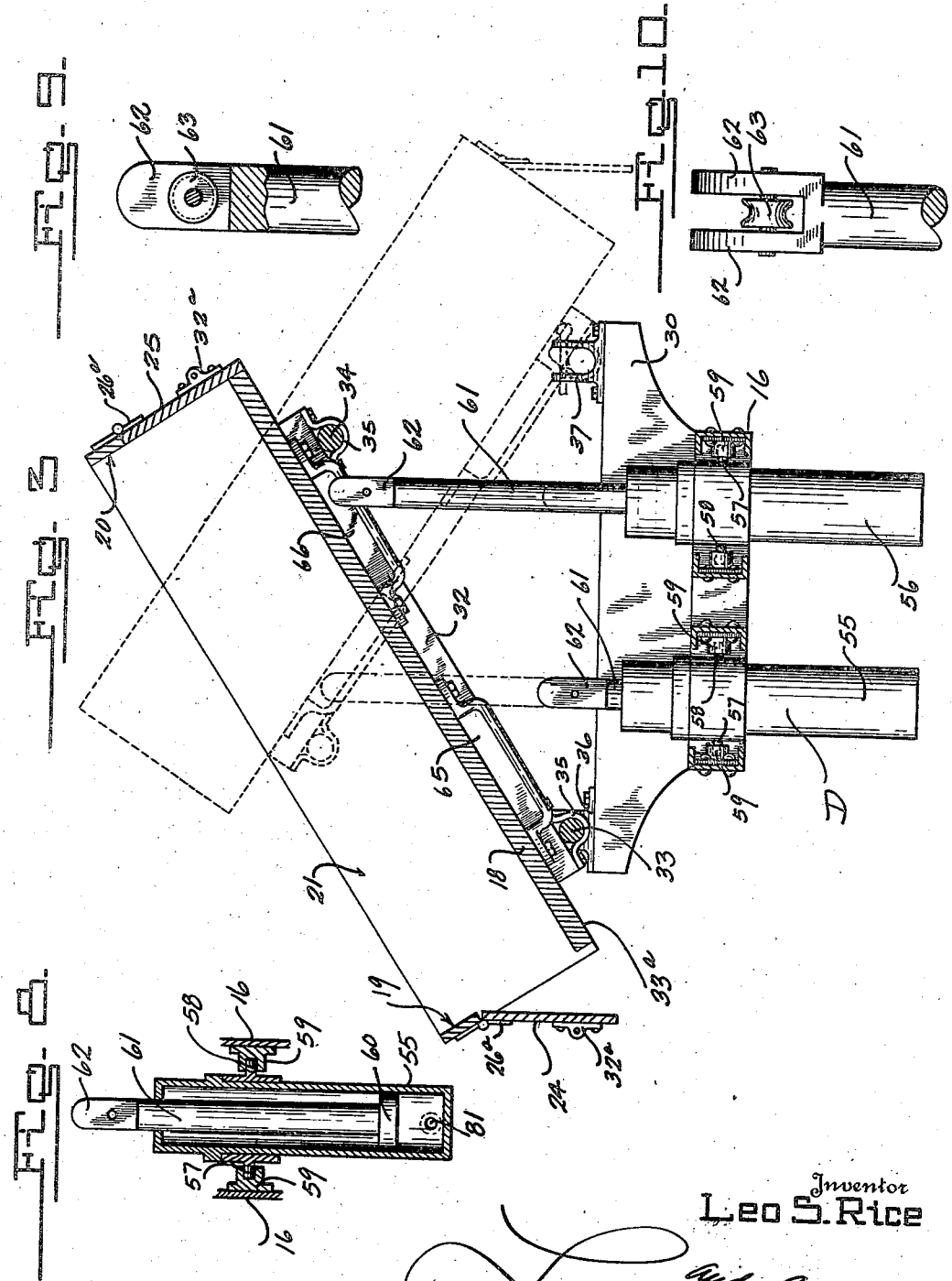

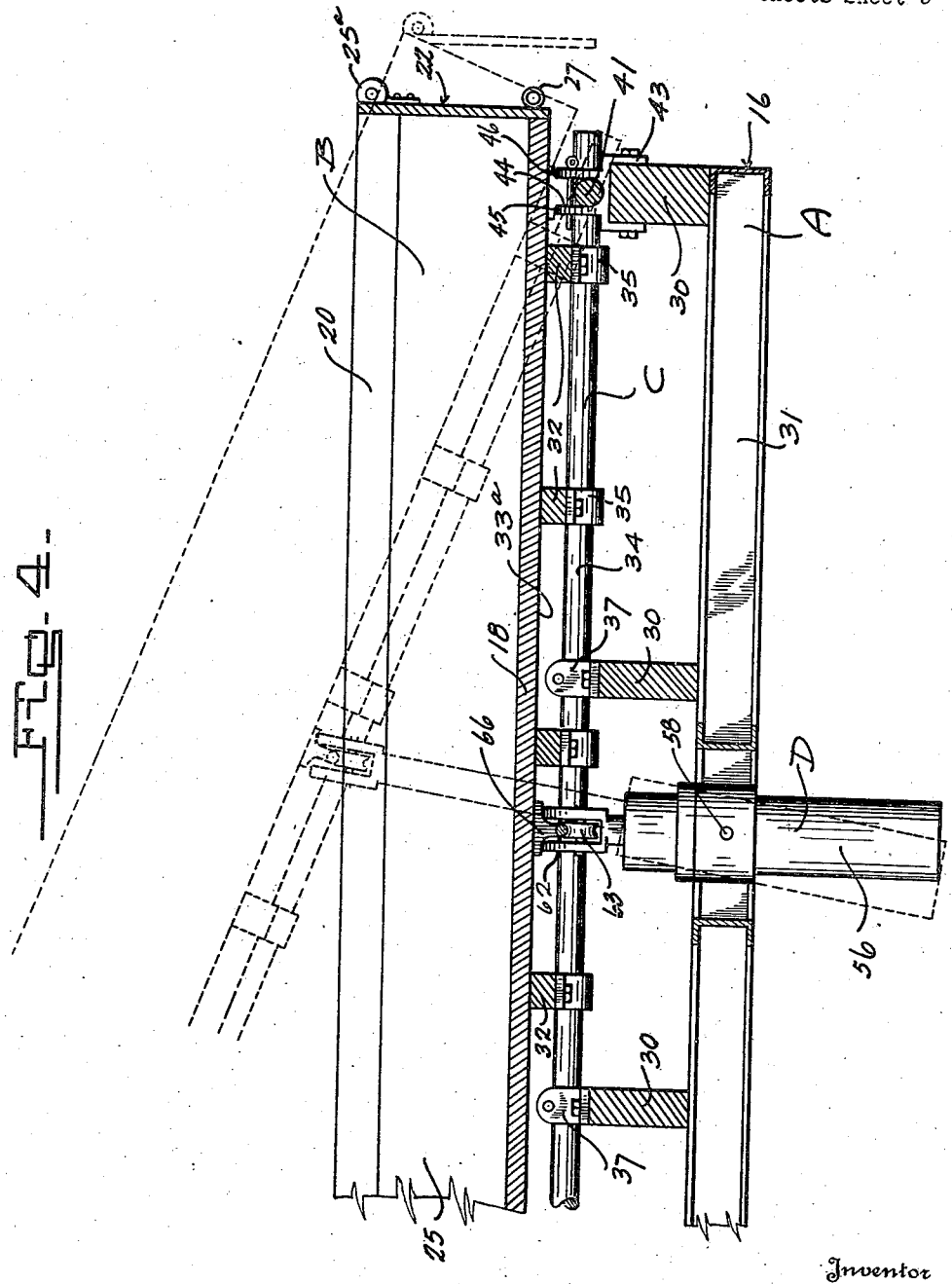

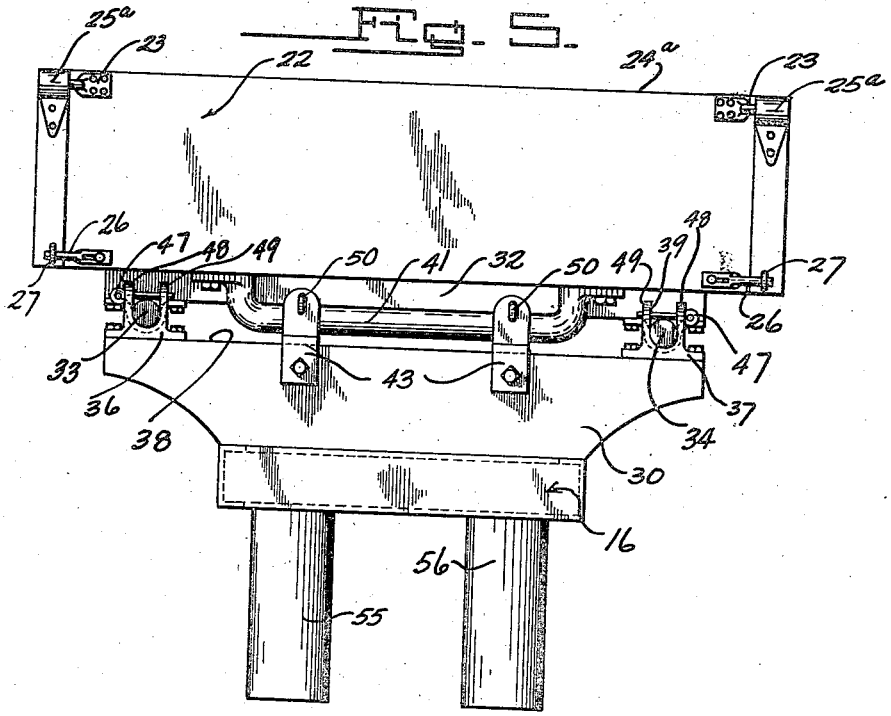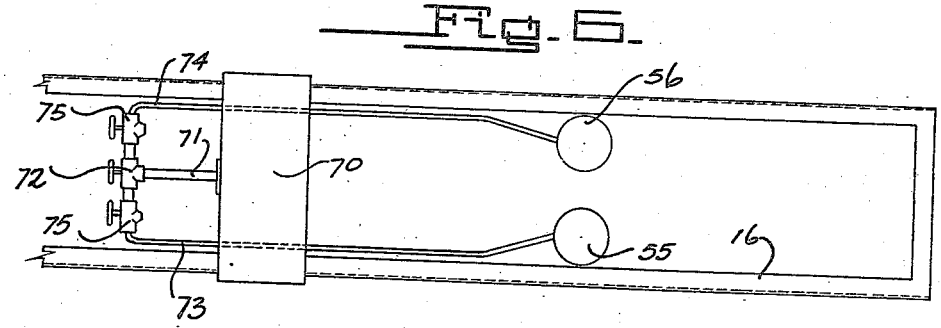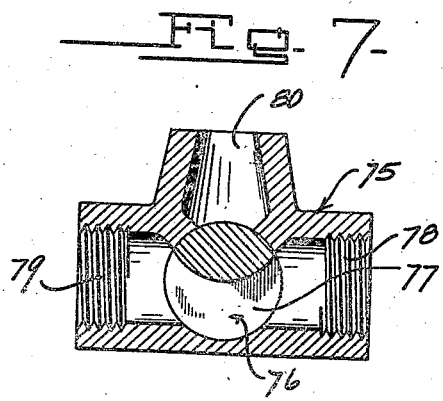

Patented Aug. 5, 1924.

1,503,710

UNITED STATES PATENT OFFICE.

LEO S. RICE, OF VAN WERT, OHIO.

DUMPING VEHICLE.

Application filed August 4, 1921. Serial No. 489,766.

*To all whom it may concern:*

Be it known that I, LEO S. RICE, a citizen of the United States, residing at Van Wert, in the county of Van Wert and State of Ohio, have invented certain new and useful Improvements in Dumping Vehicles, of which the following is a specification.

This invention relates to improvements in dumping vehicles.

The primary object of the invention is the provision of a dumping vehicle capable of side and end dumping of the body bed for the purpose of convenient disposition of hauled material.

A further object of the invention is the provision of a dumping vehicle of the above described character, in which pivoting of the bed for dumping purpose is effected by compression means.

A further object of the invention is the provision of a dumping bed for vehicles, which can be manufactured as an accessory to be attached to the chassis of standard makes of motor trucks.

Other objects and advantages will be apparent during the course of the following detailed description.

In the accompanying drawings, forming a part of this specification, and in which similar reference characters designate corresponding parts throughout the several views, Figure 1 is a side elevation of the improved dumping vehicle.

Figure 2 is a plan view of the improved dumping vehicle, and showing the retaining body removed therefrom.

Figure 3 is a transverse cross sectional view taken on the line 3—3 of Figure 2.

Figure 4 is an enlarged fragmentary cross sectional view taken longitudinally of the vehicle, and on the line 4—4 of Figure 2.

Figure 5 is an end view showing the manner in which the retaining bed is mounted to the chassis frame of the vehicle for tipping purposes.

Figure 6 is a diagrammatic illustration of the actuating means used for dumping the body upon the vehicle.

Figure 7 is a cross sectional view through the valve structure used in regulating dumping of the body.

Figure 8 is a vertical cross sectional view taken through a detail of the actuating mechanism.

Figure 9 is a fragmentary view, partly in section showing details of the actuating means.

Figure 10 is a view partly in section of the device illustrated in Figure 9, and taken at right angles thereto.

In the drawings, wherein for the purpose of illustration is shown the preferred embodiment of my invention, the letter A designates a vehicle of any approved type, having the special body B mounted thereon by the means C; said means C adapting the body B for pivoting upon the vehicle A for dumping purposes. Compression means D is provided, for actuation of the vehicle body B for selective deposit of material therefrom.

The vehicle A may be of any preferred type, including a driver's seat 15, and the chassis frame 16.

The body B may of course, be of any design, suitable for transportation of different materials. In the present instance, the body B includes a floor or bed 18; right and left side walls 19 and 20, and forward and rear end retaining walls 21 and 22. As will be subsequently set forth in detail, the body B is adapted for tipping sideways upon either longitudinal side of the chassis frame 16, as well as for tipping upon the rear of the chassis frame 16 for end tipping of the vehicle body B. Consequently, the side gates 24 and 25, have been provided as a portion of the side walls 19 and 20 respectively, and hinged thereto, as by the hinged members 26ª. It is preferred, that the gates 24 and 25 be hingedly connected adjacent the top of the side walls 19 and 20, thus leaving the gates to be swung outwardly from the bottom thereof adjacent the bed 18. A retaining device 28 has been provided for regulating swinging of the side gates 24 and 25, including a pair of arms or rods 29 and 30ª, pivotally connected to an oscillating member or lever 31ª, substantially centrally of the longitudinal length of the gates 24 and 25. The rods 29 and 30ª act in the nature of bolts, being slidable upon the exterior of the gates 24 and 25, by the bearings 32ª mounted thereon. Keepers 33ᵇ are mounted upon posts forwardly and rearwardly of the body B, for receiving the extreme ends of the rods 29 and 30ª, when the gates 24 and 25 are to be locked in position upon the body B.

The end wall 22 serves the additional purpose of a gate having pivot bolts 23 mounted adjacent the top margin 24ª thereof, and upon opposite ends for pivotal reception within bearings 25ª, upon the rear end posts of the body B. Thus, the end wall or gate 22 swings outwardly substantially similar to the side gates 24 and 25, bolt members 26 being slidably carried by the gate 22 for engagement in keepers 27, whereby the gate or wall 22 may be locked in place to form a retaining wall upon the body B.

Referring now to the means C for mounting the body B upon the chassis frame A, cross transoms 30 are positioned at intervals upon the chassis frame 16 of the vehicle A; these transoms 30 being preferably of wood, and of a type in standard use. It will be noted from an observation of Figure 5 of the drawings that the transoms project considerably from each longitudinal member 31 of the chassis frame 16, as is the practice in mounting of vehicle bodies. Transverse bracing sills 32 are affixed at spaced intervals upon the bottom 33ª of the body bed 18, for reinforcing purposes. Side rods 33 and 34, preferably circular in formation, are longitudinally attached to the bottoms of the reinforcing sills 32, and to the left and right sides of the body B respectively, as by the detachable bearing clamps 35. It is preferred, that the supporting rods 33 and 34, be placed parallel of the longitudinal axis of the body B, and spaced in predetermined relation with respect to the longitudinal center of the body B. Bearings 36 and 37, are provided upon the left and right overhanging ends of each transom 30, and detachably positioned upon the top surfaces 38 thereof, to provide open substantially U-shaped seating pockets 39. The bearing members 36, upon the left side of each transom 30, have their pockets 39 extending in alignment for pivotal bearing of the rod 33. Similarly, the bearings 37 upon the right side of each transom 30, are in alignment to have their pockets 39 pivotally receive the bar 34 upon the body B.

A substantially U-shaped bar 41 is detachably connected to the under surface 33ª of the bed 18, extending transversely of the body B, and mounted immediately over the top surface 38 of the rear transom 30. Detachable bearing clamps 43 are provided, upon the top 38 of this rear transom 30, having pockets 44 therein formed by the projecting flanges 45 and 46, and for the pivotal reception of the bar 41. Pins 47 or any suitable locking mechanism may be provided for engaging the flanges 48 and 49, forming the pockets 39 of the side bearings 36 and 37, the same being provided to prevent detachment of the longitudinal side bars 33 and 34, from the vehicle A. Likewise, locking pins 50 are provided for engagement with the legs 45 and 46 of the end bearing members 43, to prevent accidental detachment of the end pivoting bar support 41.

The compression actuating means D is of novel formation, including a pair of cylinders 55 and 56, mounted adjacent the left and right sides of the vehicle A respectively. It is preferred that the cylinders 55 and 56 be mounted substantially intermediate the extreme ends of the body B, the exact placing thereof depending upon the size and requirements of the dumping vehicle. Each cylinder 55 and 56 is preferably swivelly mounted for oscillation longitudinally of the vehicle, having diametrically opposed projecting lugs 57 and 58 for engagement in bearings 59, clamped in any suitable arrangement to the chassis frame 16. A piston 60 is provided for each cylinder 55 and 56 having a piston rod 61 attached thereto for reciprocation therewith. The upper free end of each piston rod 61 is provided with spaced arms 62, to provide a yoke structure, whereby a groove wheel 63 may be rotatably supported thereby. Track members 65 and 66 are provided, upon the bottom surface 33ª of the bed 18, transversely of the body B, and for cooperation with the piston arrangement in the cylinders 55 and 56 respectively.

Various ways, may of course be provided for actuation of the piston members 50, for reciprocation thereof to actuate the body B in a manner to be subsequently set forth. A hydraulic oil lift system utilizing hydraulic jacks, may be used in this connection. A preferred arrangement, however, is that of compressed air, and the control of which has been clearly illustrated in the diagrammatic view in Figure 6. A compressed air tank 70, is preferably mounted in any convenient position upon the chassis frame 16, having a main lead conduit or pipe 71, extending to a position in proximate relation to the driver's seat 15 of the vehicle A, and having a control valve 72 therein for regulation of compressed air flow from the feed pipe 71. Lateral feed pipes 73 and 74 are provided, emanating from the control valve 72, and leading to the cylinders 55 and 56 respectively. Three-way regulating valves 75 are provided in each of the lateral lead pipes 73 and 74 for the purpose of effectively controlling flow of compressed air into the cylinders 55 and 56. A cross section of one of the regulating valves is shown in Figure 7. The rotary valve head 76 is provided with a passageway 77 therein. The entrance 78 of the valve 75 having connection with the pipe 71 is preferably in alignment with the passageway 79 upon the opposite side of the valve head 76, and which leads directly into either of the lateral feed pipes 73 or 74. An exhaust opening 80 is provided for exit of air from either of the cylinders 55 or 56, as will be hereinafter described.

In using the improved dumping device for tipping the body B upon the extreme end of the chassis 16, the various locking pins 47 which retain the longitudinal side bars 33 and 34 in position, are removed. End tipping of the body B necessitates using both of the cylinders 55 and 56. The valve head 76 of each of the regulating valves 75 are so turned that the passageway 77 of each is in alignment to permit passage of air directly through each valve structure 75, and into the cylinders 55 and 56. When the operator opens the control valve 72, the compressed air from tank 70 will immediately be directed to the lateral pipes 73 and 74, and into the cylinders 55 and 56, through the openings 81 therein. The compressed air will of course expand in the cylinders 55 and 56, and upon contact with the piston 60 will force the same upwardly. As the grooved wheels 63 are in firm engagement with the trackways 65 and 66, the same provide a bearing which transmits the compressed air force to the body B, tipping the same upwardly in the end bearing members 43. Due to the swivel mounting of the cylinders 55 and 56, the same may be readily tipped in their bearings 59 to compensate for the angular tipping of the body B with respect to the vehicle A. This flexible character of the cylinders has been illustrated in dotted lines in Figures 1 and 4 of the drawings. The end gate 22, is of course swung outwardly to release the load of material in the body B. When all of the material has been dumped in the position desired, the compressed air from cylinders 55 and 56 is readily exhausted by adjustment of the valve heads 76 in the regulating valves 75, whereby the passageway 77, in valve heads 76 may communicate to release air through the lead pipes 73 and 74 to the exhaust openings 80 of these regulating valves 75.

The body B can be tipped from either side of the chassis frame 16. If it is desired to tip the body B to the right of the vehicle A, the pins 47 holding the longitudinal rod 33 are all detached; as well as the pins 50 holding the end bar 41. The pins 47 holding the right longitudinal side bar 34 remain in position to lock this longitudinal member to the chassis frame 16. In tipping the body B to a side of the vehicle frame A, only one cylinder may be brought into use. When tipping the body B to the right as above mentioned, the cylinder 55 must be the actuating cylinder, and vice versa. In actuating the cylinder 55, the valve head 76 of the regulating valve 75 for control of compressed air into the cylinder 56 is turned, in such manner that the passageway 77 is closed to the entrance opening 78, and preventing flow of compressed air from the tank 70 to this cylinder 56. The valve 75 of cylinder 55 on the other hand, is opened, so that compressed air may pass from the pipe 71 into the cylinder 55 in the manner above described. When the operator opens the control valve 72, the compressed air will actuate the piston 60 in the cylinder 55, in the manner above described. In order to provide for the acute inclination of the body B when tipped in this manner, the track ways 65 and 66 have been provided for cooperation with the above described rotating wheels 63 on the piston stems 61. Thus, in tipping the body to the right, the wheel 63 will ride over the rail of the track 65, to compensate for angular disposition of the body B on the vehicle A in tipping position, and thus provide a flexible connection between the piston and the body B. In operating the body B to tip to the right side, the same will assume a position, substantially as illustrated in the dotted lines in Figure 3 of the drawings. Likewise, in tipping the body to the left side, the full lines illustrated in Figure 3 illustrated the position of the body B with respect to the vehicle A.

From the foregoing, it can be seen that a dumping vehicle has been provided, which is of great utility, and that the same may be tipped to either longitudinal side and to the end, merely by the operation of valve controls; in this respect differentiating from the laborious devices in common use, whereby manual exertion is to a great extent necessary for tipping of a vehicle body.

Various changes in the shape, size and arrangement of parts, may be made to the form of the invention herein shown and described, without departing from the spirit of the invention or the scope of the claims.

I claim:

1. A dumping vehicle comprising a chassis, a body, means pivotally mounting the body on the chassis at the longitudinal sides thereof, tracks suported below said body disposed transversely thereof, cylinders carried by said chassis, pistons reciprocable in said cylinders, piston rods having the upper ends thereof bifurcated, and pulleys disposed within said bifurcated ends of said piston rods for slidable engagement with the tracks of said body, and fluid compression means acting within said cylinder to move said pistons and piston rods so that said pulleys will slide over said tracks for selective lateral dumping of the vehicle body.

2. A dumping vehicle comprising a chassis, a body, means for selective pivotal movement of the body on said chassis at the lateral sides thereof and at the ends thereof, a cylinder for longitudinal oscillation with respect to the body carried by said chassis, and piston means for the cylinder adapted for oscillative pivoting to said vehicle body when the same is tipped at the end of said chassis, and for sliding engagement with said vehicle body when the body is laterally tipped.

LEO S. RICE.